Patented Nov. 11, 1930

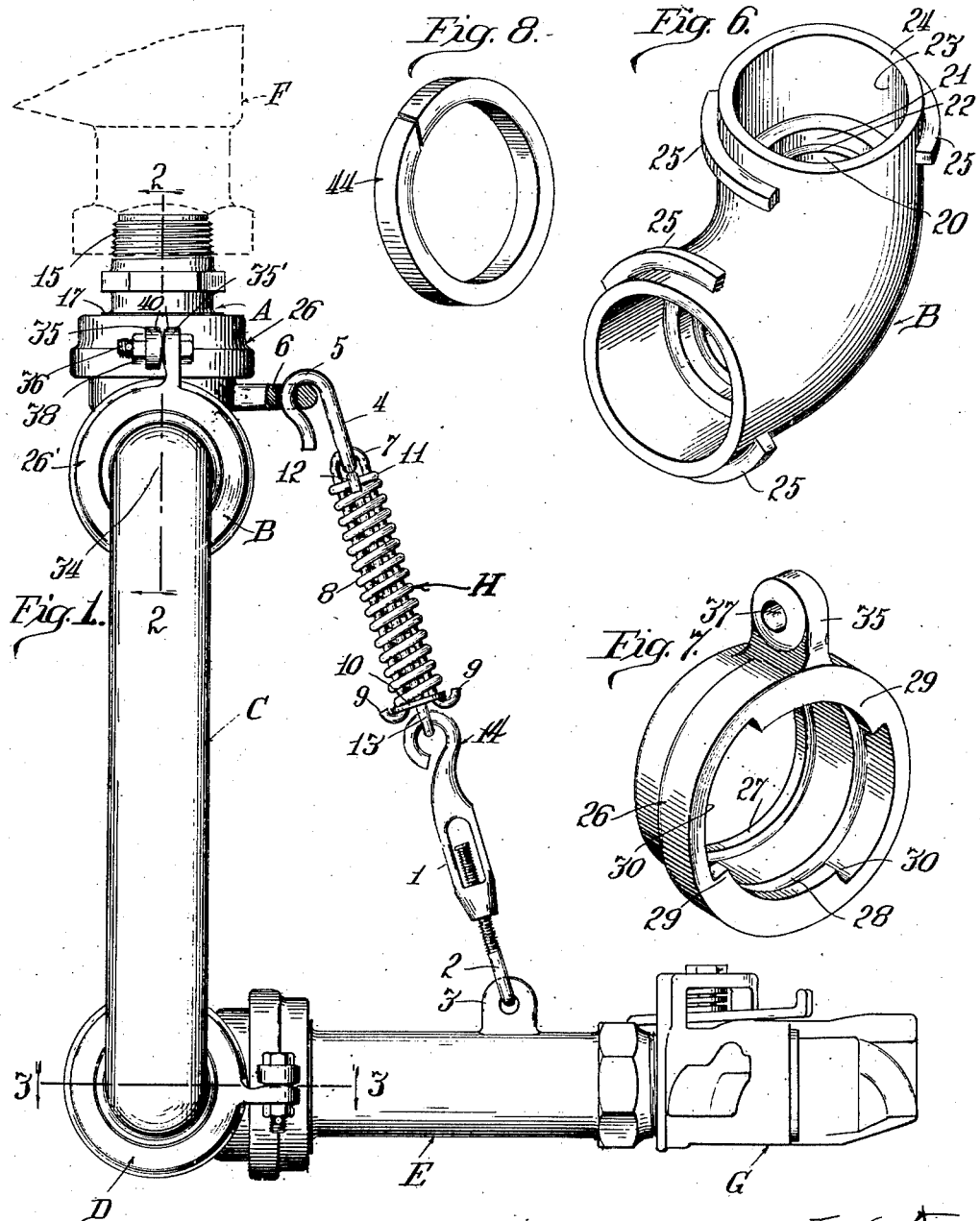

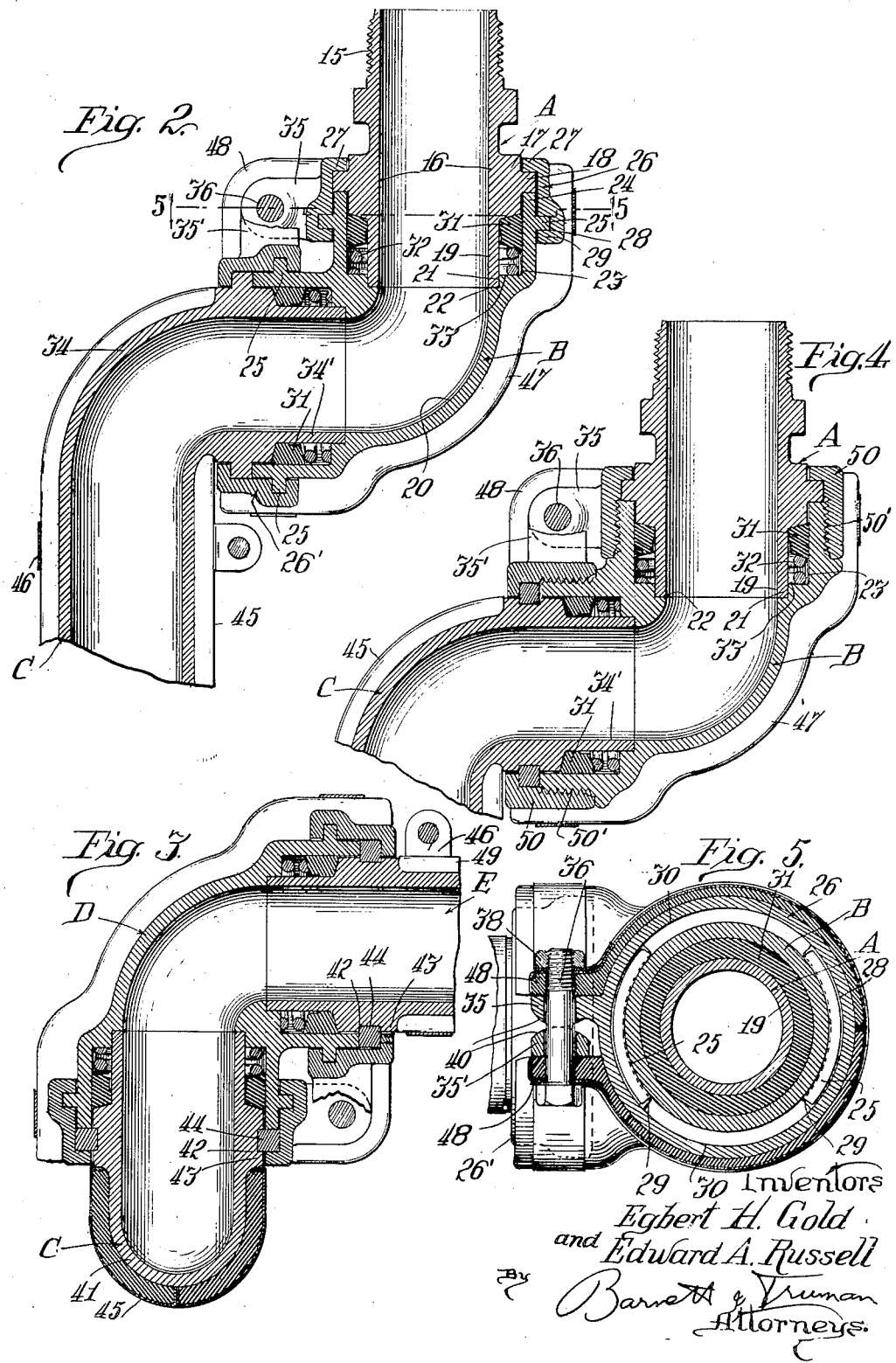

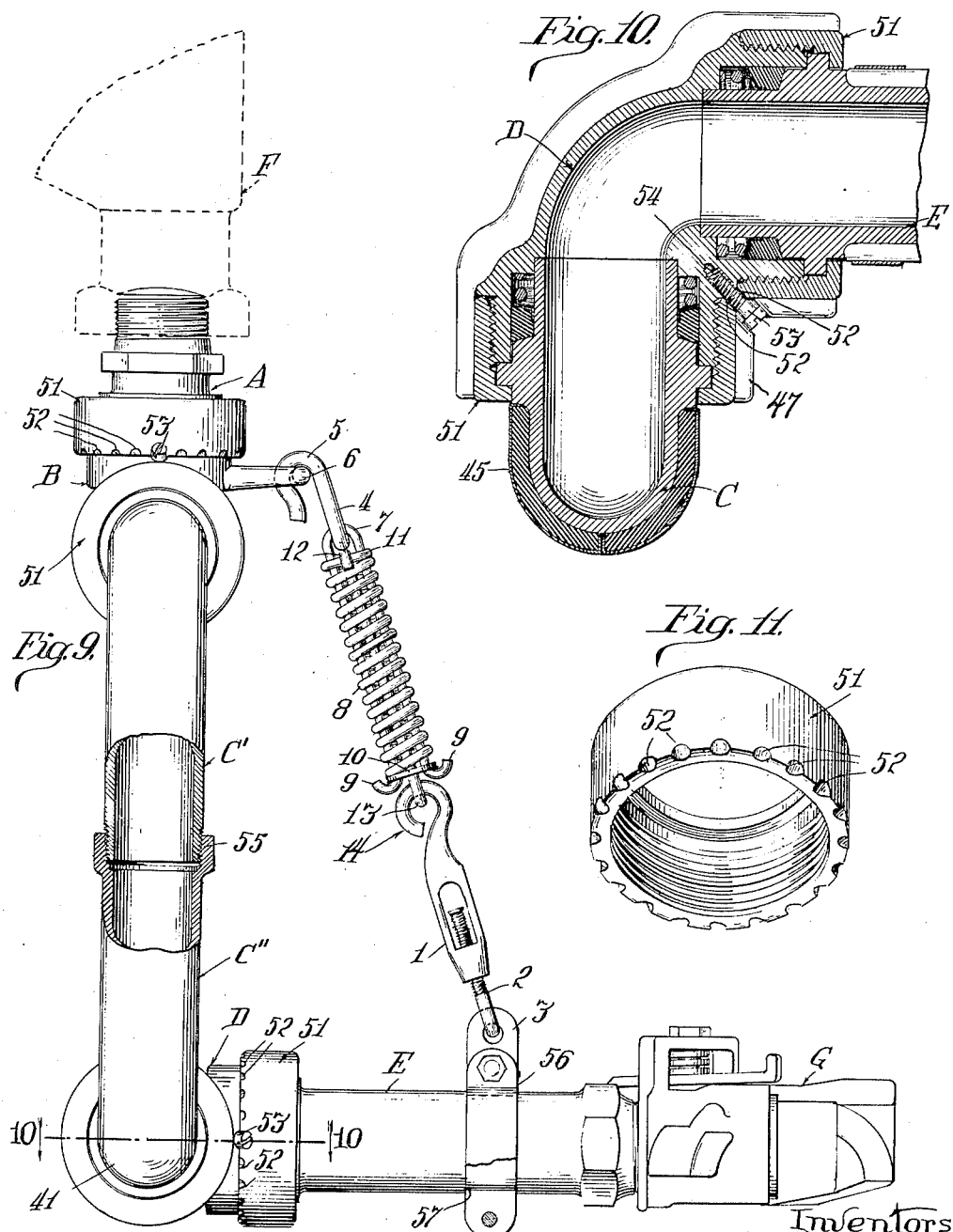

1,781,456

UNITED STATES PATENT OFFICE

EGBERT H. GOLD, OF EVANSTON, AND EDWARD A. RUSSELL, OF CHICAGO, ILLINOIS; SAID RUSSELL ASSIGNOR TO VAPOR CAR HEATING COMPANY, INC., OF CHICAGO, ILLINOIS, A CORPORATION OF NEW YORK; MARGARET JAYNE GOLD AND BISCAYNE TRUST COMPANY EXECUTORS OF SAID EGBERT H. GOLD, DECEASED

FLEXIBLE PIPE STRUCTURE

Application filed September 2, 1927. Serial No. 217,050.

This invention relates to a conduit or tubular structure consisting of metal elements flexibly articulated or swiveled together so as to form a fluid tight connection between the train pipes of the adjacent cars of a railroad train, to replace the rubber hose heretofore used for this purpose. The complete connection consists, in each case, of two of these flexible structures, one for each of the train pipes to be connected, these structures being coupled together by any suitable form of coupler such as has been used with the rubber hose heretofore generally employed for making this connection.

This improved conduit structure consists of a plurality of tubular conduit members, some of which are formed with elbows, the ends of each adjacent pair of members being telescoped one within the other and provided with means for sealing the joint against the escape of steam, without interfering with relative rotation between the members about the axis of the telescoped members. The several elbows and swiveled joints between the members are so arranged that although one end of the flexible structure is rigidly supported from the car train pipe, the coupler mounted at the other end of the structure is permitted a practically universal movement in any direction to allow for the relative movements between the cars and to permit the two couplers to be secured together or disconnected.

The particular object of this invention is to provide a flexible conduit structure in which the steam passage is substantially unbroken and of constant diameter and cross sectional area throughout the structure, whereby the minimum resistance to the passage of steam through the structure is presented.

Another object is to provide improved means for sealing the swiveled joints between the several members, without impeding the passage of steam through the conduit.

Another object is to provide improved means for detachably holding the telescoped conduit members against separation, due to the weight of the members and the steam pressure within the conduit.

Another object is to provide improved means whereby a pair of adjacent holding members, at each end of an elbow joint, are locked together to secure each of the holding members against removal.

Another object is to provide improved means for insulating substantially the entire flexible structure.

Another object is to provide an improved flexible conduit structure in which many of the component parts are duplicates and interchangeable whereby the cost of manufacturing and assembly is considerably reduced.

Other objects and advantages of this invention will be more apparent from the following detailed description of one approved form of the apparatus.

In the accompanying drawings:

Fig. 1 is an elevation of one of the assembled conduit structures.

Fig. 2 is a vertical section on a somewhat enlarged scale taken substantially on the line 2—2 of Fig. 1.

Fig. 3 is an enlarged horizontal section, taken substantially on the line 3—3 of Fig. 1.

Fig. 4 is a vertical section, similar to Fig. 2, showing a modification.

Fig. 5 is a horizontal section taken substantially on the line 5—5 of Fig. 2.

Fig. 6 is a perspective view of one of the elbow conduit members.

Fig. 7 is a perspective view of one of the removable collars.

Fig. 8 is a perspective view of one of the split rings.

Fig. 9 is a view similar to Fig. 1 showing another modification.

Fig. 10 is an enlarged horizontal section, taken substantially on the line 10—10 of Fig. 9.

Fig. 11 is a perspective view of a removable collar.

Referring first to Figs. 1 to 8 inclusive, the flexible conduit structure consists of a plurality of rigid conduit members A, B, C, D and E, which are swiveled together as hereinafter explained in detail. The uppermost conduit member A is adapted to support the entire assembly by being attached to the end of the car train pipe or the end train pipe valve, indicated by dotted lines at F in Fig. 1. The coupler member G, which may be of any approved form, is mounted at the free end of the conduit member E at the other end of the flexible structure. This coupler G is adapted to be mated with a similar coupler on the adjacent car.

A means shown generally at H is provided to support the lower members D, E and G of the structure when disconnected from an adjacent car coupling. In the form here shown, this connection H comprises a turn buckle 1 having a hook 2 at its lower end engaging with an eye 3 formed on the conduit member E. An upper link 4 has a hook 5 engaging in a bracket arm 6 extending from one side of the upper conduit member A and projecting over the lower horizontal conduit member E. The lower end of the link 4 is hooked within the closed end of a U-shaped member 7 which projects through a compression spring 8. The lower hooked ends 9 of member 7 engage about an annular washer 10 which abuts one end of the compression spring 8. A similar washer 11 at the other end of spring 8 is engaged by the hooked ends 12 of a U-shaped member 13 similar to member 7. The lower closed end of the member 13 is hooked within the eye 14 at the upper end of turnbuckle 1. This assembled supporting connection is not only sufficiently flexible to permit the necessary movements of the lower horizontally extending conduit members, but the compression spring 8 will also give sufficiently to permit the necessary extension of the conduit structure when the train is rounding curves.

The upper conduit member A is provided with an externally threaded upper end portion 15 whereby it is engaged within the downwardly projecting end of the car train pipe or end train pipe valve indicated at F. The inner cylindrical wall 16 of this conduit member A is continuous from one end of the member to the other to form an unbroken steam passage of constant diameter. The member A is provided on its outer portion with an enlarged annular projection 17, from which extends an annular shoulder or ring 18. The lower end portion 19 of member A is of reduced external diameter so that the outer surface of this portion 19 and one end of the enlarged portion 17 form two walls of the chamber for receiving the sealing means hereinafter described.

The elbow member B has an inner steam passage 20 of substantially the same circular cross section as the passage 16 in the member A, so as to form a continuation thereof. The passage 20 is curved throughout ninety degrees, so that the open ends thereof project at right angles to one another, as clearly shown in Fig. 2. The two open end portions of the member B are substantially identical with one another and a description of one will suffice for both. The open end of the passage 20 is enlarged as at 21 to form an annular shoulder 22 against which the end of the portion 19 of conduit member A abuts, the inner diameter of the portion 21 of passage 20 corresponding with the outer diameter of portion 19 of member A. A little farther along the passage within member B is again enlarged as indicated at 23 to substantially the same internal diameter as the external diameter of annular projection 17 on the member A. The extreme end portion 24 of the elbow member B surrounds a portion of the annular projection 17, abuts against one side face of the ring 18, and is of the same outer diameter as this ring. Formed on the outer surface of the annular portion 24 are a pair of oppositely disposed arcuate projections 25, each substantially 90° in length. These projections 25 substantially form portions of a ring or annular shoulder from which opposite arcuate portions of substantially 90° in length have been removed. The form and position of these projections 25 will be best understood from an inspection of Fig. 6.

The collar 26 (shown in perspective in Fig. 7) has an internal diameter through the greater portion of its length sufficient to fit over the ring 18 and the outer surface of end portion 24 of the conduit member B. An inturned flange 27 at one end of this collar is adapted to rotatably engage against one side of the ring 18 on the conduit member A. The collar 26 is formed adjacent its other end with an annular groove 28 adapted to receive the arcuate projections 25 on the member B. The end wall 29 of the collar 26 is cut away as at 30 to permit the collar to be passed, parallel to the axis of the conduit, over the projections 25. A quarter rotation of the collar will then lock the projections 25 within the groove 28 thus preventing removal of the collar from the conduit member B, and constituting a means for supporting this conduit member from the ring 18 on the conduit member A. The portion 19 of the conduit A will be held telescoped within the conduit B, with its end in engagement with the shoulder 22, and it will be noted that the steam passages 16 and 20 now form substantial continuations of one another, with an unbroken surface and of practically constant diameter. It will be noted that the collar 26 may be slipped into place over the upper end of conduit member A until the flange 27 engages against the upper sides of ring 18.

An annular space or chamber will be formed between the overlapping extensions 19 and 24 of the conduit members A and B, and within this chamber is housed the annular gasket 31. A compression spring 32 is confined between the annular shoulder 33 in the member B and the gasket 31 and serves to force the gasket into engagement with the lower face of the enlargement 17 on member A and also spreads the gasket into engagement with the outer surface of member 19 and the inner surface of member 24 so as to effectively seal the joint between the members A and B against the escape of steam. At the same time relative rotation will be permitted between the members A and B about the vertical axis of the conduit passage therethrough, one of the members sliding upon the gasket 31 to permit this movement.

The upper end of the vertically extending conduit member C is formed with a 90° elbow portion 34 so that the projecting end portion 34' of conduit C (which corresponds in all respects to the lower projecting end 19 of the conduit A) may be received within the horizontally extending end portion of the elbow conduit B. The outer portion of this upper end of conduit C corresponds in all respects to the lower end of the conduit A, and the same sealing means is employed between the two conduit members and a collar 26' similar in all respects to the collar 26 is utilized to lock the member C to the member B. The collars 26 and 26' are each provided with a projecting ear 35 and 35' respectively, each aperture to receive a locking bolt 36. When each of the collars has been rotated to locking position, the ears 35 and 35' will overlap one another with their bolt receiving openings in alignment, due to the fact that the two collars rotate in planes intersecting at 90° with one another. By simply passing the bolt 36 through the openings 37 in the ears and drawing the ears together by screwing the nut 38 onto this bolt, the two collars will be locked against removal and the conduit members A, B and C and the auxiliary parts mounted therein will be held securely in assembled relation. The parts may be easily disassembled by simply removing the bolt 36, and rotating each of the collars 26 and 26' through an angle of 90°. It will be noted that the collar 26' is slipped over the conduit member C from the lower end thereof until its inturned flange 27 engages the ring 18 at the upper end of conduit C. It will be noted that the inner faces of the ears 35 and 35' are rounded, as indicated at 40, so that they may be drawn tightly together by the bolt 36 without danger of breaking or twisting the ears or collars if the parts are not all in perfect alignment.

The lower end of conduit member C is provided with an elbow portion 41 similar in all respects to the elbow portion 34 at the upper end thereof. This elbow 41 is connected with the end of the conduit member E by means of the elbow shaped conduit member D in substantially the same manner that the upper end of the conduit C is connected with the upper conduit member A by means of the elbow B. The elbow D is identical in construction with the elbow B. However, when in operative position the curved axis of the passage in elbow D lies in a horizontal plane whereas the similar axis of the elbow B is positioned in a vertical plane.

It will be recollected that the collar 26' which engages with the lower end of elbow member B was described as having been slipped on over the lower end of the vertical conduit structure C. Obviously it would be impossible to get this collar over a projecting ring such as 18, and for this reason the similar projecting ring at the lower end of the conduit C is made removable. An annular groove 42 is formed in the projecting portion 43 (which corresponds otherwise to the projection 17 at the upper end of the conduit C as previously described). A split ring 44 (see Fig. 8) is sprung into this groove 42 after the two collar members 26, one for each end of the conduit C, have been slipped onto the conduit member. After the split ring 44 is in place within the groove 42, the projecting portion thereof is substantially identical with and serves the same purpose as the projecting ring 18 previously described. In the same manner, a split ring 44 is secured to the outer end portion of the horizontal conduit member E after the collar 26 has been slipped thereon, since the projecting ear 3 will prevent this collar from being slipped over the other end of the conduit E. Aside from the use of these split rings 44, the elbow connection and the two swiveled joints at the lower end of vertical conduit C are substantially identical in all respects with the similar connections at the upper end of this conduit.

In order to minimize the heat loss it is desirable that these flexible conduit structures be insulated as much as possible, in the same manner that insulation is applied to the other car train pipes. However, with the forms of flexible structures heretofore in use, which were either flexible throughout as in the rubber hoses, or involved one or more joints of the ball and socket type, it has been impracticable to cover any great portion of the structure with insulating material due to the necessity for allowing flexibility of movement between the different portions of the structure. In the present form of flexible conduit structure, the relative movement between any two abutting conduit members is confined to a single plane, and it is possible to almost completely cover all of the otherwise exposed portions of the conduit member with insulating material, the insulating coverings on the respective members abutting in substantially the plane wherein the relative movement takes place. In order to simplify the disclosure this insulating covering has been omitted in Fig. 1, but is shown in each of the detail views 2, 3, 4 and 5. The vertical conduit member C is provided with a jacket or covering of insulating material 45, which may be split along one side and secured in place about the conduit by means of metallic straps or clamps 46. A jacket or covering 47 of insulating material is provided to inclose each of the elbow conduits B and D, this covering 47 also extending over the collars 26 and 26'. This jacket 47 may be split along its inner side and provided with ears 48 through which the securing bolt 36 is passed so that this jacket is held in place by the same means that locks together the ears 35 and 35'. Of course, any other improved means for securing the jacket in place might be utilized. The important feature is that the end of jacket 47 may be brought closely adjacent to the end of jacket 45 so that practically no portions of the conduits B and D remain unprotected by an insulating covering.

In a similar manner, the horizontal conduit member E is protected by an insulating covering 49 secured in place by straps 46 (see Fig. 3).

It will be noted that the elbow conduit members B and D are identical in construction, and so are all four of the collars 26. The formation at the ends of the several members A, C, and E are also identical, with the exception of the use of the split rings 44 in some instances. The gaskets 31 and springs 32 are the same for all of the joints. Thus many of the parts are interchangeable, and the number of machines and operations needed for producing these structures are greatly reduced.

It will also be noted that although there are several curves in the steam passage through this conduit, the passage has a continuous and unbroken outer surface and is of substantially constant diameter from end to end of the structure. Experience has shown that additional turns in the steam passage have little influence towards increasing the resistance to the flow of steam, but any pockets or projections along the path of the steam serve to produce eddy currents and greatly impede the progress of the steam through the structure. The passage throughout this improved conduit structure is practically continuous and offers little resistance to the passage of the steam. The several swiveled joints arranged in planes at right angles to one another permit universal movements of the coupler G in any direction without deforming the steam passage or changing its cross sectional area at any point. At the same time, the structure remains completely insulated, from end to end, no matter what position it may assume.

In the modification shown in Fig. 4 the holding collars 50, which are substituted for the collars 26, are screwed onto the ends of the elbow member B' instead of fastened in place by the bayonet joint heretofore described. The arcuate projections 25 on the member B and the arcuate slots 28 in member 26 have been omitted, and the cooperating screw threads shown at 50' have been substituted on these two members. The same locking ears 35 and 35' are utilized in this modification. In assembling this modified form, one of the collars 50 is first screwed into position and is then unscrewed for a part of a turn, sufficiently to move the ear 35 back out of the path of rotation of the other ear 35' as the other collar 49 is screwed into place. After the second collar is in place, the first collar is returned to its completely applied position which will bring the ears 35 and 35' into position to receive the locking bolt 36.

In the modification shown in Figs. 9, 10 and 11, the collars 51 which take the place of the collars 50 of Fig. 4 are not provided with the locking ears 35 and 35', but in lieu thereof the outer edge of the inner end of each collar is formed with a circumferential series of grooves or depressions 52, as best shown in Fig. 11. When the collars 51 at the respective ends of the elbow B or D are screwed into place a pair of these grooves 52 (one on each collar) may be brought into opposition so as to form a passage for receiving a locking screw 53 which is received in a suitably threaded aperture 54 in the elbow member. This screw may also be passed through a portion of the insulating covering 47 so as to hold the same in place. The screw 53 serves to prevent the rotation of either of the collars 51 and hence locks them in position. This form of locking means is also equally applicable to the collars 26 shown in Figs. 1, 2, 3, 6 and 7, and could be substituted for the locking ears 35 and 35' and bolt 36 as now shown in those figures.

In Fig. 9 is also disclosed an expedient for avoiding the use of the split rings 44 in any of the previously described modifications. To do this the vertical conduit member C is formed of a pair of members C' and C" which are screwed together or otherwise engaged with one another at some intermediate point as indicated at 55. By disengaging the members C' and C" at 55, both of the collars 26, 49 or 51 may be slipped onto the portions of the conduit member. In order to permit the collar 26, 49 or 51, as the case may be, to be slipped onto the conduit member E behind a fixed ring 18 and avoid the use of a split ring 44, the ear 3 to which the supporting means H is attached may be made removable. As shown in Fig. 9, a two part collar 56 on one member of which the ear 3 is formed is attached about the conduit member E, preferably seating in an annular groove 57 formed in the member E. Before the collar 56 is attached, the collar 26, 49 or 51 may be slipped over the smaller end of the conduit E, (which screws into the coupler G) and brought into place behind the fixed ring or shoulder 18.

We claim:

1. In a flexible pipe structure, a pair of conduit members, the inner end of one being telescoped within the other whereby the members are relatively rotatable about the axis of the telescoped parts, means for sealing the joint between the members, and means for holding the members against separation without interfering with their relative rotation comprising an annular shoulder on one of the members, a pair of oppositely projecting arcuate lugs on the other member, and a collar having a flange adapted to engage behind the annular shoulder, and a pair of inwardly projecting annular lugs adapted to engage behind the first-mentioned lugs by a partial rotation of the collar.

2. In a flexible pipe structure, an elbow shaped conduit member and a pair of other conduit members telescopically engaged with the ends of the elbow, means for sealing the joint between each pair of telescoped members, outstanding annular shoulders adjacent the ends of each conduit member, one shoulder of each adjacent pair being cut away at intervals to form arcuate lugs, a collar having flanges engageable behind each pair of shoulders, one of the flanges being cut away at intervals to permit locking engagement with the lugs by a partial rotation of the collar, each of the collars having a projecting ear, and means for locking the ears together to prevent rotation of the collars.

3. In a flexible pipe structure, an elbow shaped conduit member and a pair of other conduit members telescopically engaged with the ends of the elbow, means for sealing the joint between each pair of telescoped members, outstanding annular shoulders adjacent the ends of two of the conduit members, and a pair of collars engageable by a rotative movement with the adjacent end portions of the other conduit members, each collar having a flange to engage behind the shoulder of the other member, a projecting ear on each collar, the planes of rotation of the respective ears when moved to applied position intersecting so that the ears will overlap one another, and means for locking together the overlapped ears.

4. In a flexible pipe structure, an elbow shaped conduit member and a pair of other conduit members telescopically engaged with the ends of the elbow, means for sealing the joint between each pair of telescoped members, outstanding annular shoulders adjacent the ends of two of the conduit members, and a pair of collars engageable by a rotative movement with the adjacent end portions of the other conduit members, each collar having a flange to engage behind the shoulder of the other member, a projecting ear on each collar, the planes of rotation of the respective ears when moved to applied position intersecting, so that the ears will overlap one another, the ears having apertures which are in alignment when the ears are overlapped, and a locking bolt passed through these apertures to secure the ears together.

5. In a flexible pipe structure, a pair of conduit members, the end portion of one being telescoped within the other whereby the members are relatively rotatable about the axis of the telescoped parts, the end of the inner member filling a shouldered recess within the outer member so that the fluid passage through the members is substantially unbroken and of constant diameter throughout the structure, there being a chamber formed between the telescoped members but outside of the fluid passage, means in the chamber for sealing the joint between the members, there being an annular groove formed in the outer portion of one of the telescoped members, a split ring mounted in this groove and forming a projecting annular shoulder, and an annular collar removably secured to the other member and having a flange engaging behind the shoulder to prevent separation of the members.

EGBERT H. GOLD.
EDWARD A. RUSSELL.